(12) United States Patent
Selim (10) Patent No.: US 9,310,834 B2
(45) Date of Patent: Apr. 12, 2016

(54) FULL SCREEN MODE

(75) Inventor: Mo Selim, Oakville (CA)

(73) Assignee: Z124, Georgetown (KY)

( * ) Notice: Subject to any disclaimer, the term of this patent is extended or adjusted under 35 U.S.C. 154(b) by 379 days.

(21) Appl. No.: 13/174,406

(22) Filed: Jun. 30, 2011

(65) Prior Publication Data

US 2013/0002568 A1  Jan. 3, 2013

(51) Int. Cl.
*G06F 1/16* (2006.01)
*G06F 3/0488* (2013.01)
*G06F 3/0484* (2013.01)

(52) U.S. Cl.
CPC ............ *G06F 1/1616* (2013.01); *G06F 1/1641* (2013.01); *G06F 1/1643* (2013.01); *G06F 3/0484* (2013.01); *G06F 3/04886* (2013.01)

(58) Field of Classification Search
CPC ..... G06F 3/048; G06F 3/0481; G06F 3/0482; G06F 3/041; G06F 1/1616; G06F 1/1641; G06F 1/1643; G06F 3/0484; G06F 3/04886
USPC ........................... 345/1.1, 1.3, 156, 173–175; 715/700–866
See application file for complete search history.

(56) References Cited

U.S. PATENT DOCUMENTS

| 5,841,078 A | 11/1998 | Miller et al. |
| 6,222,538 B1 * | 4/2001 | Anderson ...................... 715/709 |
| 7,551,899 B1 * | 6/2009 | Nicolas et al. .................. 455/73 |
| 2003/0237043 A1 * | 12/2003 | Novak et al. ............... 715/500.1 |
| 2004/0025112 A1 | 2/2004 | Chasen et al. |
| 2006/0197753 A1 | 9/2006 | Hotelling |
| 2007/0063923 A1 | 3/2007 | Koenig |
| 2007/0268264 A1 | 11/2007 | Aarras et al. |
| 2008/0165144 A1 * | 7/2008 | Forstall et al. ................. 345/173 |
| 2010/0182265 A1 * | 7/2010 | Kim et al. ...................... 345/173 |
| 2010/0304793 A1 | 12/2010 | Kim et al. |
| 2011/0298726 A1 | 12/2011 | Wu et al. |
| 2012/0084697 A1 * | 4/2012 | Reeves .......................... 715/772 |

\* cited by examiner

*Primary Examiner* — Aneeta Yodichkas
*Assistant Examiner* — Saifeldin Elnafia
(74) *Attorney, Agent, or Firm* — Haverstock & Owens LLP (57) ABSTRACT

Systems for, and methods of, dual screen smartphones are described herein. The dual screens are hingedly coupled and can be rotated into an open position forming one contiguous screen. A processor is configured to dismiss any action bar or status bar in response to a prompt thereby maximizing media across the entirety of any of the dual screens or contiguous screen formed by their intersection. An overlay command presented by the processor allows a user to minimize, tile, zoom, pan or dismiss the media when it is maximized.

27 Claims, 13 Drawing Sheets

FULL SCREEN MODE

FIELD OF THE INVENTION

The present invention relates to the field of portable multiple screen devices. More specifically, the present invention relates to systems for and methods of enabling content to be presented and controlled across the entirety of one or more screens.

BACKGROUND OF THE INVENTION

Figure 1:
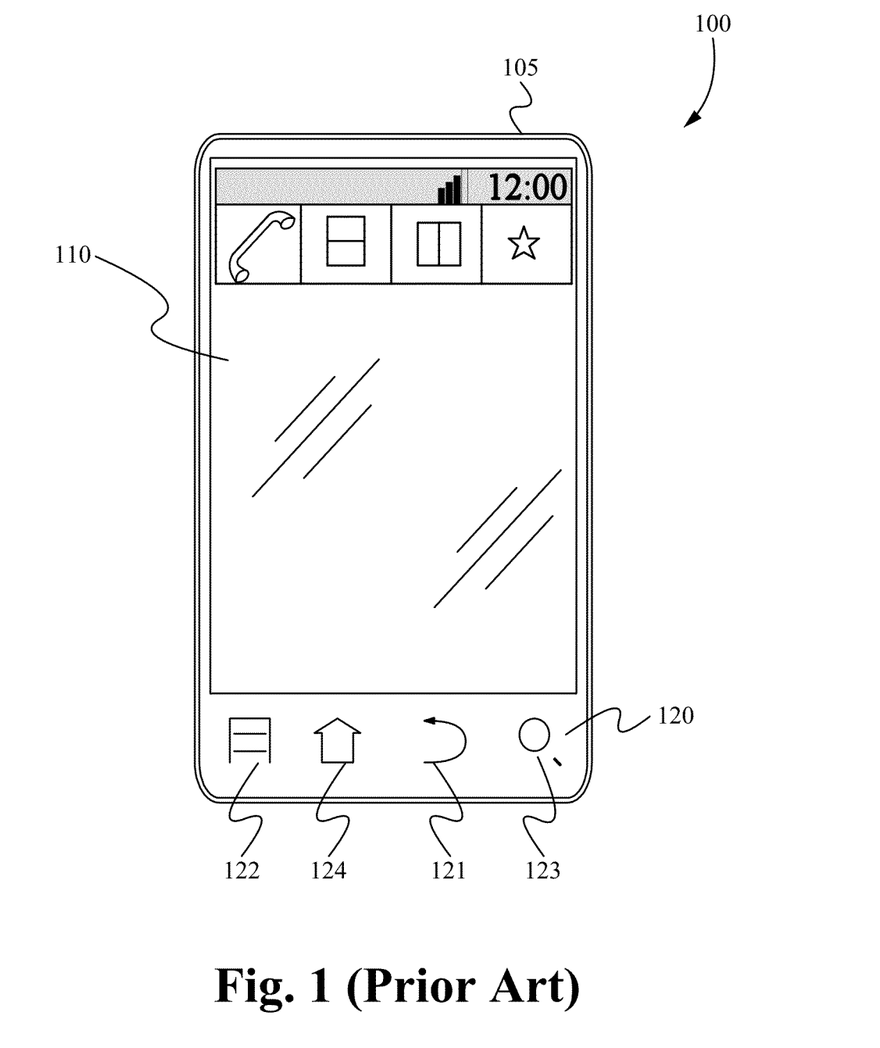
FIG. 1 shows a prior art smartphone having a dedicated action bar.

Many portable gaming devices have one or more touch sensitive screens for enhanced presentation and manipulation of content and media displayed thereon. FIG. 1 shows a prior art portable smartphone 100. The smartphone 100 comprises a body 105 and a screen 110. The screen 110 has a perimeter that fits well within the body 105. Generally, the screen 110 is smaller than the body 105 in order to accommodate an action bar 120. In prior art smartphone devices, action bar 120 is a tactile interface that is physically distinct from the screen 110. The action bar 120 comprises the most basic top level commands, such as a return key 121, a forward key 122, a search key 123, and a home key 124. Furthermore, because the action bar 120 is a physical tactile interface, it cannot be dismissed, nor can it be user configured for functionality. As a result, the entirety of the smartphone 100 cannot be used as a display since some portion thereof will always be taken up by the action bar 120.

SUMMARY OF THE INVENTION

Embodiments of the presently-claimed invention are directed to systems for and methods of enabling maximizing media across an entirety of a screen. The screen can be a first screen on a portable device, a second screen, or one contiguous screen formed by the first and second screens. In contrast to prior art solutions, the two screens have the look and feel of one screen, enabling many embodiments not possible in the prior art. Portions of the first, second, or contiguous screen can be automatically configured or user configured to maximize displayed media across the entirety of screen by dismissing an action bar. For example, a first screen can have a maximized web site displayed thereon. The second screen can then display usual well known smartphone applications, such as a telephone, email, messaging, and various applications. Alternatively, the second screen can be powered down to save power. Alternatively, the smartphone is placed in an open position and the media is displayed across the entirety of the contiguous display formed by the joining of the first and second displays.

In a first aspect of the invention, a portable handheld device comprises a first touch sensitive screen and a second touch sensitive screen. An action bar is disposed on at least a portion of one the first touch sensitive screen and a second touch sensitive screen. Preferably, the device further comprises a hinge for rotatably coupling the first touch sensitive screen and second touch sensitive screen and setting the device in at least one of an open and a closed position. In an open position, the first touch sensitive screen and second touch sensitive screen form a single contiguous display. Otherwise, the two screens can be used independently. Also, the device comprises a processing means for displaying media across at least one of the first touch sensitive screen, the second touch sensitive screen, and the single contiguous display, wherein the processor means is configured to dismiss the action bar and display the media across the entirety of at least one of the first touch sensitive screen, the second touch sensitive screen, and the single contiguous display. By dismissing the action bar, the device is placed in "full screen mode," wherein the entirety of the screen displays the chosen media. In some embodiments, the processing means is configured to dismiss the action bar upon a prompt by a user, thereby causing the media to be displayed across the entirety of the contiguous display. Alternatively, the processing means is configured to dismiss the action bar upon a prompt by the media, thereby causing the media to be displayed across the entirety of the contiguous display. Still alternatively, the processing means is configured to dismiss the action bar upon placing the device in a open position, thereby causing the media to be displayed across the entirety of the contiguous display. In order to escape full screen mode, the processor is configured to present at least one overlay command function button upon displaying the media across the entirety of at least one of the first touch sensitive screen, the second touch sensitive screen, and the single contiguous display. The overlay command function comprises, for example, re-presenting the action bar, a zoom function, a panning function, a scrolling function, or any other useful function. Preferably, the device further comprises an orientation sensing means for orienting the media according to how a user is holding the device. The orientation sensing means can be an accelerometer, a tilt meter, or any other convenient or application specific module.

In another aspect of the invention, a method of presenting media on a portable device having two screens, the method comprising, selectively displaying media across a at least one of first touch sensitive display, a second touch sensitive display, and a contiguous touch sensitive display formed by the first touch sensitive display and the second touch sensitive display, and displaying the media across the entirety of at least one of first touch sensitive display, a second touch sensitive display, and a contiguous touch sensitive display upon a prompt. Preferably, the method further comprises overlaying a command function on the screen. The user can use the command function area for dismissing the full screen mode, scrolling, panning, zooming, or the like. The prompt for entering full screen mode can come from the user, the media, or can be automatically triggered when the device is placed in an open configuration (i.e., forming of the continguous screen.

DETAILED DESCRIPTION OF THE DRAWINGS

The systems and methods described herein enable two touch screens to selectively display a media in canvas mode across the entirety of a screen. The two touch screens preferably are hingedly coupled and in an open position appear to a user to have the same look and feel as one contiguous, unbroken screen. The screens can operate in unison or independently to show one medium or multiple media. A processor is configured to dismiss any action bar or status bar in response to a prompt thereby maximizing media across the entirety of any of the dual screens or contiguous screen formed by their intersection. An overlay command presented by the processor allows a user to minimize, tile, zoom, pan or dismiss the media when the media is maximized. The following figures illustrate features of specific embodiments of the presently-claimed invention. Throughout the figures, below, identical labels refer to identical or similar elements. The following embodiments are intended to illustrate the features of the presently-claimed invention. The invention is not limited to only the disclosed embodiments. It is understood that elements are interchangeable among the embodiments.

Figure 2A:
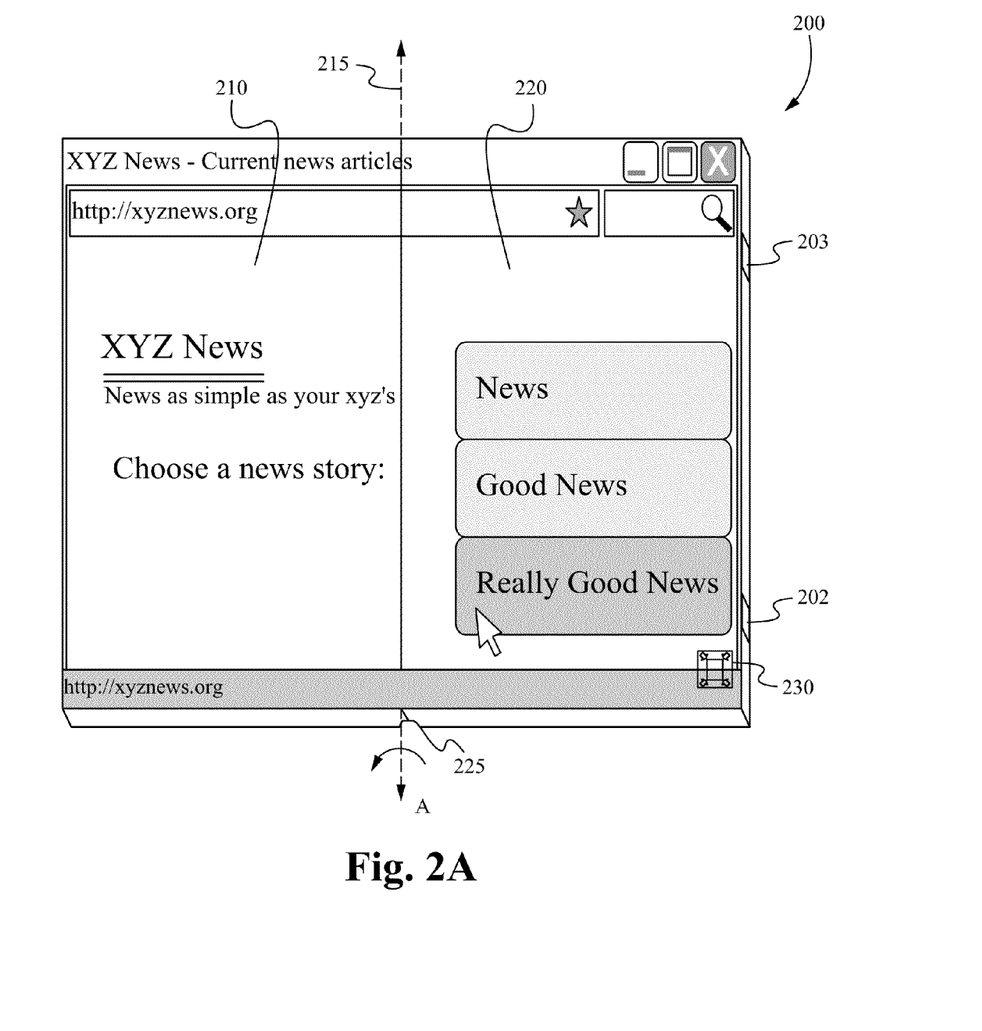
FIG. 2A shows an embodiment of a smartphone having a contiguous screen formed of two separate screens.
Figure 2B:
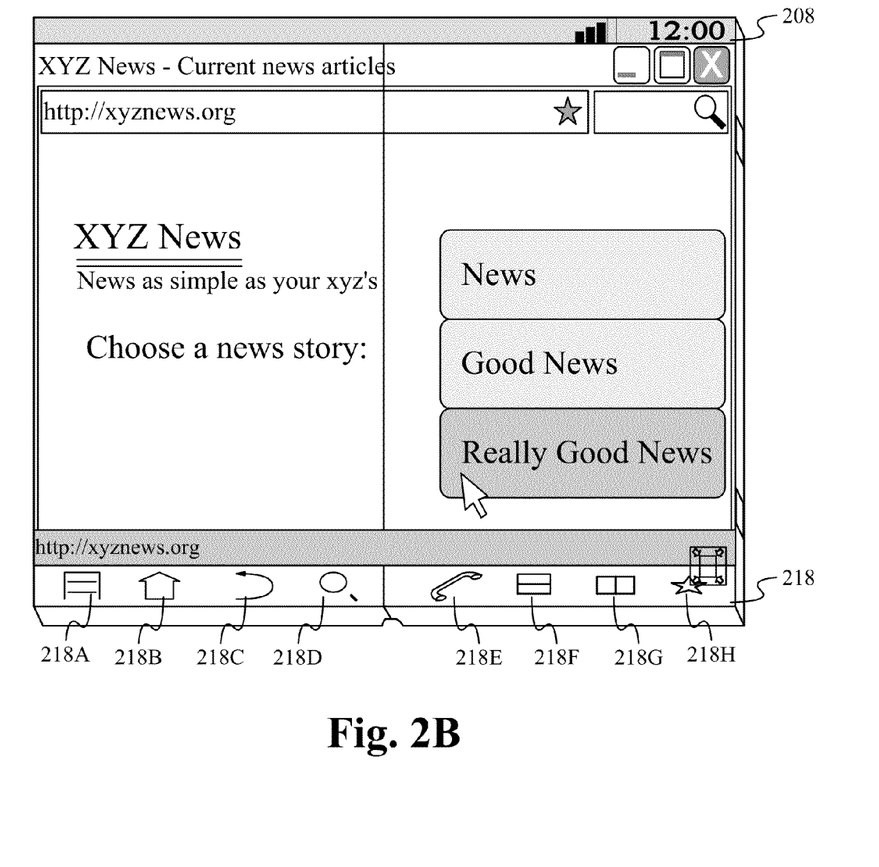
FIG. 2B shows an embodiment of a smartphone having a contiguous screen formed of two separate screens.

FIGS. 2A and 2B show a smartphone 200 displaying canvas based media in a full screen mode and a non full screen mode respectively. FIG. 2A shows the smartphone 200 having a first screen 210 and a second screen 220. The first screen 210 and second screen 220 are rotatably coupled by a hinge 225 thereby enabling rotation about the axis A. As such, the smartphone 200 is shown in an open configuration. In the open configuration, the first screen 210 and second screen 220 come together along the line 215 and form one contiguous screen. Advantageously, canvas based media can be displayed across the entirety of the contiguous screen. In the embodiment shown, a website is displayed. A processing means (not shown) launches an application, such as the web browser displaying the web site in the example of FIG. 2A.

Referring now to FIG. 2B, an action bar 218 and a status bar 208 are displayed across the contiguous screen. The action bar 218 comprises functional buttons 218A-218H for performing common tasks. In this example, the action bar 218 comprises a back button 219C, an application list call 218A, a home key 218B, a search button 218D, a forward button (not illustrated), a phone button 218E, a help key 218H, and a user configurable space 218F-218G. Such function buttons are generally chosen because of their frequent use. The status bar 208 comprises indicators of the operation of the smartphone 200 and the status of any communications applications being run by the smartphone 200. In this example a signal strength indicator and a clock are shown. Additionally, a battery level indicator and a message or email indicator can be included as well. Although both the status bar 208 and the action bar 218 are useful, they need not be displayed continuously as they consume area on the smartphone 200. As discussed above, prior art solutions have such functions as permanent physical buttons thereby necessarily limiting the size of the screen. Some prior art devices also have permanent indicators to show incoming messages, low battery, or the like, also requiring space.

Referring back to FIG. 2A, the status bar 208 and action bar 218 of FIG. 2B are dismissed, thereby enabling the canvas based media, in this example a web site, to be displayed across the entirety of the contiguous screen. In some embodiments, the processing means (not shown) detects when the smartphone 200 is placed in the open configuration shown, and automatically dismisses the status bar 208 and action bar 218 of FIG. 2B, thereby entering "full screen mode." Alternatively, a user can prompt the smartphone 200 to enter full screen mode by a physical prompt. By way of example, the button 218H of FIG. 2B can be a prompt for entering full screen mode. Still alternatively, some applications can automatically prompt the processing means to enter full screen mode. For example, a user can configure the processing means to enter full screen mode upon opening a web browser application. Until re-configured to do otherwise, the processing means will automatically dismiss the status bar 208 and action bar 218 of FIG. 2B when the web browser application is called. Still alternatively, the processing means will cause an application to enter full screen mode upon rotation of the smartphone 200 from a portrait orientation to a landscape orientation, or vice versa. Preferably, the processing means comprises memory for storing user settings for how and when particular applications are prompted into full screen mode. When in full screen mode, an overlay control 230 is presented. The overlay control 230 prompts the processing means to dismiss full screen mode and re-introduce the status bar 208 and action bar 218 of FIG. 2B. In some embodiments, the status bar 208 and action bar 218 are automatically re-introduced upon a change in status of the smartphone 200. For example, should the user receive a new message, the processing means re-introduces status bar 208 and action bar 218 momentarily to alert the user of the new message. The user can then toggle between the application being used and a messaging application. Still alternatively, only the status bar 208 can be introduced and dismissed only upon a prompt by the user. The user can configure the processing means to ignore any incoming messages, phone calls, or changes in status while using certain applications. The user can also configure the processing means to permanently exit full screen mode upon certain prompts. For example, the user can configure the processing means to exit both full screen mode and the web browser application when receiving a phone call. The processing means can be any off the shelf commercially available or application specific processor. Preferably, a processor optimized for mobile computing is used.

Figure 3A:
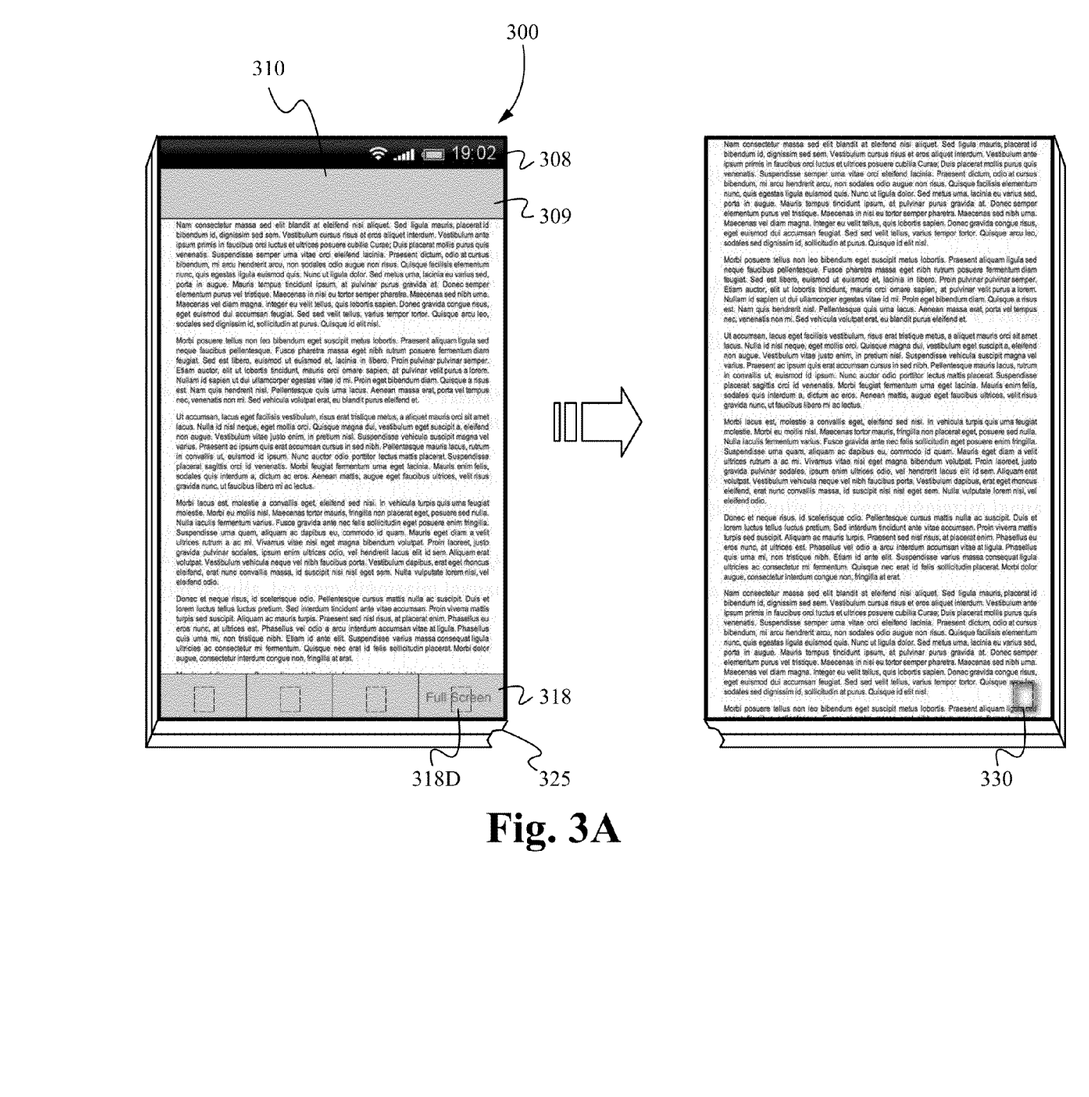
FIG. 3A shows a dual screen smartphone toggling between a full screen mode and displaying action and status bars.

In applications where a user wishes to use only one screen, the processing means can place one of the screens 210 or 220 of FIG. 2A in full screen mode. FIG. 3A shows a dual screen smartphone 300 similar to the smartphone 200 of FIGS. 2A and 2B in a closed configuration. A first screen 310 is visible. A second screen (not shown) faces the opposite direction of the first screen 310. The first screen 310 and second screen are rotatably coupled by a hinge 325. In the example of FIG. 3A, a reader application has been launched by the processing means (not shown) through a prompt by a user. Upon launching, the reader application is displayed along with a status bar 308, a secondary status bar 309, and an action bar 318. The secondary status bar 309 can be application specific to the reader application. For example, the secondary status bar can be a dictionary, a thesaurus, or an area to take notes via stylus or keyboard entry by a user regarding the material displayed on the reader. Upon a prompt, such as by touching the function button 318D on the action bar 318, the status bar 308, secondary status bar 309, and action bar 318 are dismissed by the processing means and the smartphone 300 enters portrait single full screen mode. The media, in this example a page of an e-book, is displayed across the entirety of the screen 310. An overlay control 330 is presented for exiting full screen mode or performing other functions as will be discussed below.

Figure 3B:
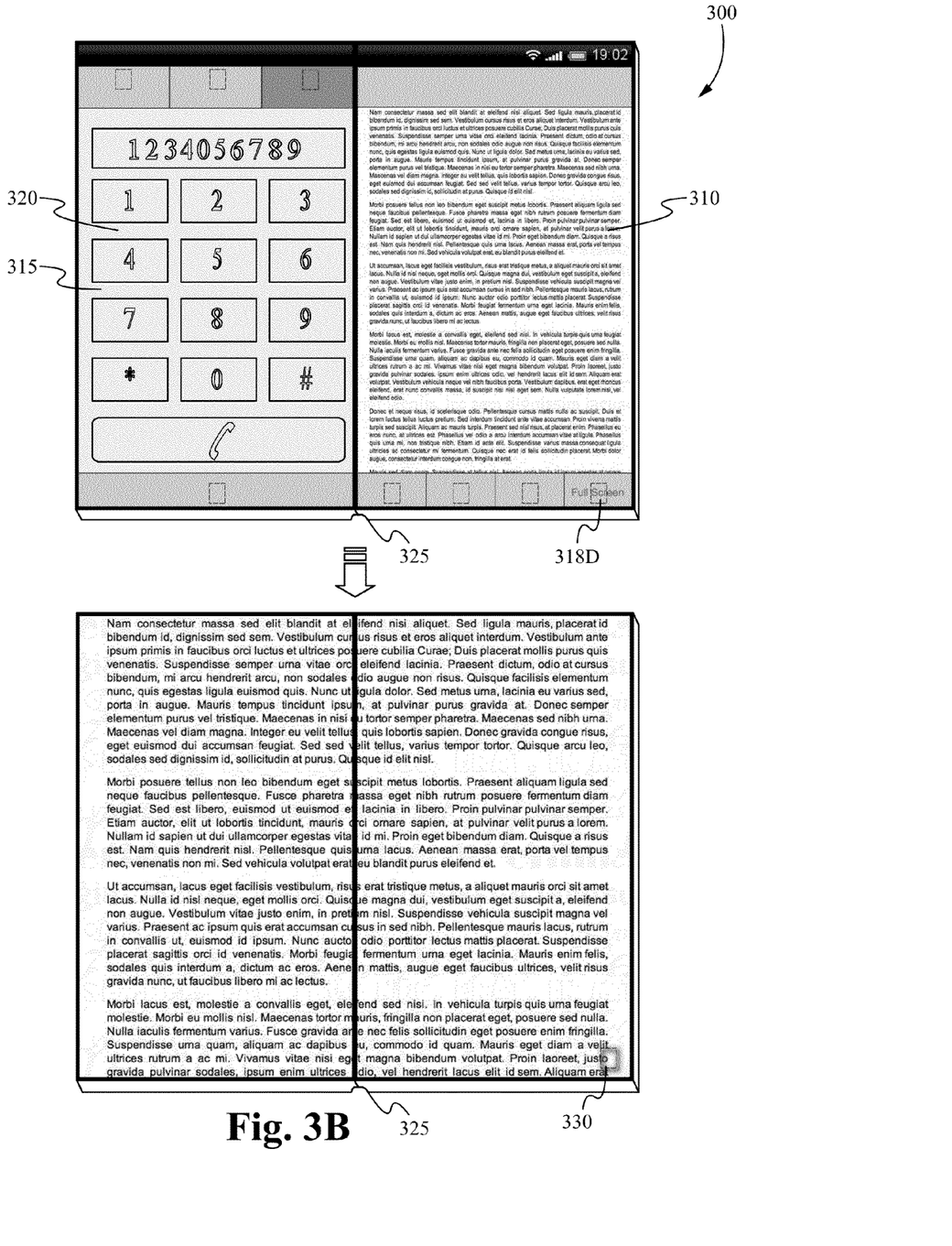
FIG. 3B shows a dual screen smartphone toggling between a full screen mode and displaying action and status bars as well as additional applications.

Referring now to FIG. 3B, when the smartphone 300 is placed in an open configuration, the first screen 310 and second screen 320 are adjacent to each other. A sensor in the hinge 325 alerts the processing means (not shown) that the smartphone is now in an open configuration. The processing means can be configured to automatically display a particular application, in this example a telephone keypad 315. Upon being placed in the open configuration, the status bar 308, secondary status bar 309 and action bar 318 are re-introduced by the processing means. The user can then prompt the processing means by the button 318D to re-enter full screen mode. Because the processing means is notified that the smartphone 300 is in an open configuration, the processing means dismisses the status bar 308, secondary status bar 309 and action bar 318 and spreads the reader application across the entirety of both the first screen 310 and the second screen 320, thereby going into portrait dual full screen mode. Because the first screen 310 and the second screen 320 form a contiguous single screen, the contiguous single screen has the same look and feel as one screen to the user. The overlay control 330 is still presented for exiting full screen mode. Alternatively, upon placing the smartphone 300 in the open configuration of 3B from the closed configuration of 3A, the reader application automatically prompts the processing means to go into portrait dual full screen mode. Still alternatively, the user can program or configure the processing means to automatically enter portrait dual full screen mode upon being set in the open configuration only for the reader application or any other applications the user wishes to use in portrait dual full screen mode.

Figure 3C:
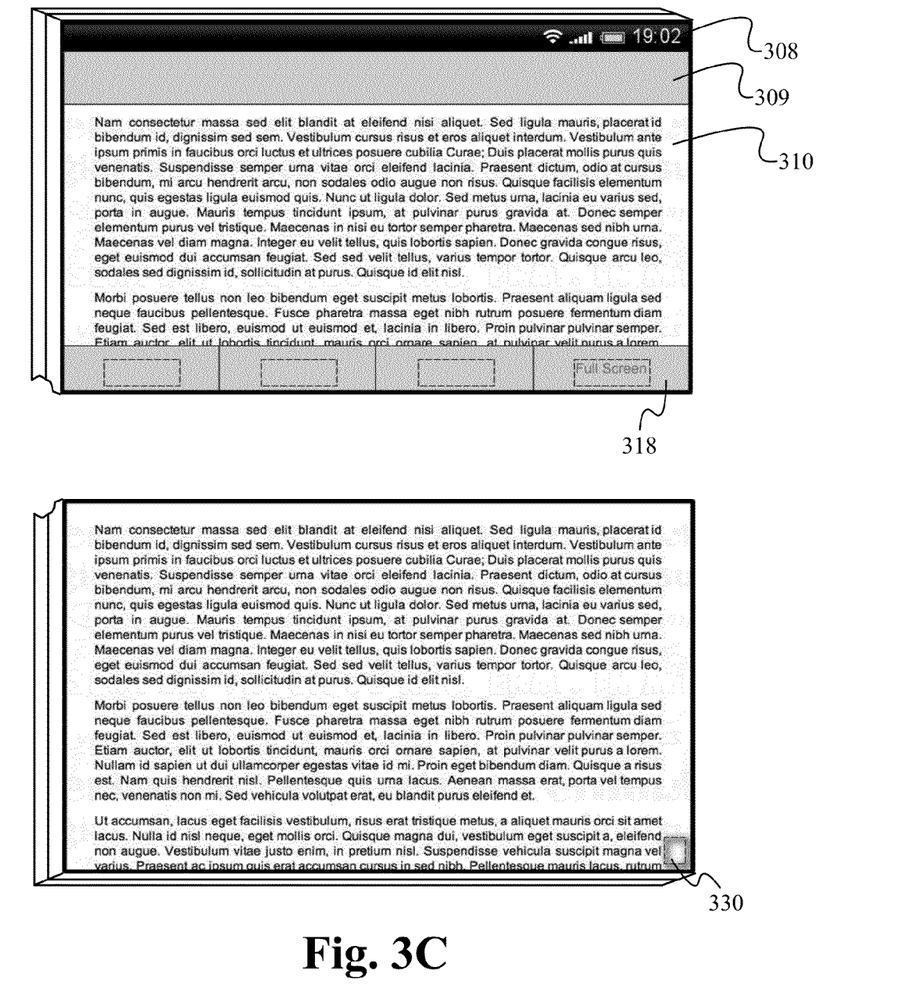
FIG. 3C shows a dual screen smartphone toggling between a full screen mode and displaying action and status bars in a landscape orientation.

FIG. 3C shows the smartphone 300 in a closed configuration in a landscape orientation. Preferably, the processing means comprises an orientation sensing module (not shown) for determining the orientation of the smartphone 300. For example, the smartphone 300 toggles between portrait orientation and landscape orientation when the smartphone 300 tips beyond 45 degrees with respect to the horizon. The orientation sensing module can be any known, convenient or applications specific tilt sensor including but not limited to an accelerometer, a tilt switch, or the like. Similarly to FIG. 3A, the status bar 308, secondary status bar 309 and action bar 318 are first presented or displayed by the processing means. Upon prompt or automatically as discussed above, the processing means dismisses the status bar 308, secondary status bar 309 and action bar 318 and enters landscape single full screen mode. Again, an overlay control 330 is presented while in landscape single full screen mode for exiting full screen mode.

Figure 3D:
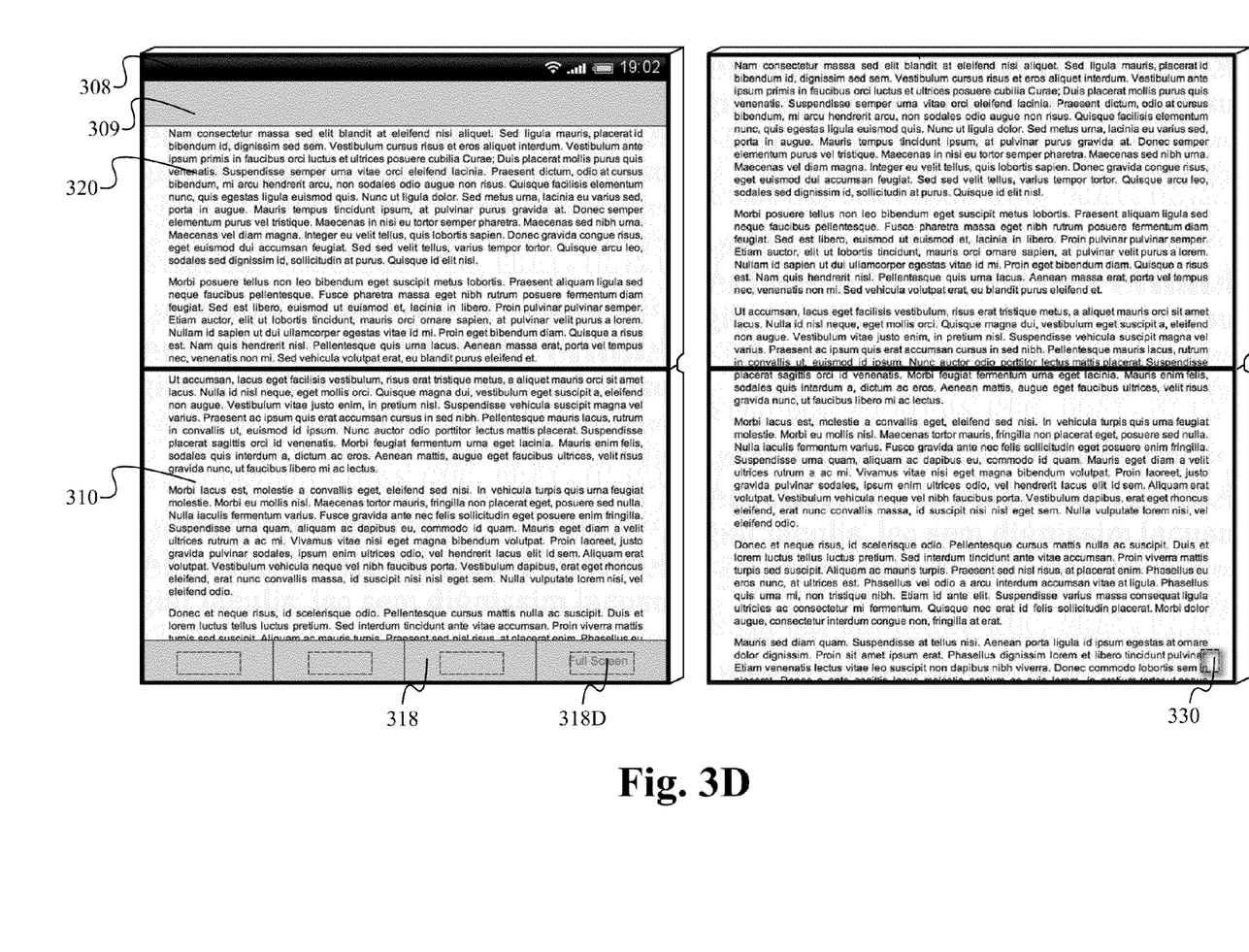
FIG. 3D shows a dual screen smartphone toggling between a full screen mode and displaying action and status bars in a landscape orientation wherein the smartphone is in an open position.

FIG. 3D shows the smartphone 300 in an open configuration in landscape orientation. The sensor in the hinge 325 again alerts the processing means that the smartphone 300 is now in an open configuration. The orientation sensing module alerts the processing means that the smartphone 300 is in landscape orientation. As in the embodiment of FIG. 3B, the first screen 310 and second screen 320 form a contiguous single screen that has the same look and feel as one screen to the user. In the example of FIG. 3D, processing means automatically dismisses the status bar 308, secondary status bar 309 and action bar 318 and spreads the reader application across the entirety of both the first screen 310 and the second screen 320, thereby going into landscape dual full screen mode. The overlay control 330 is again presented for exiting full screen mode.

Figure 4A:
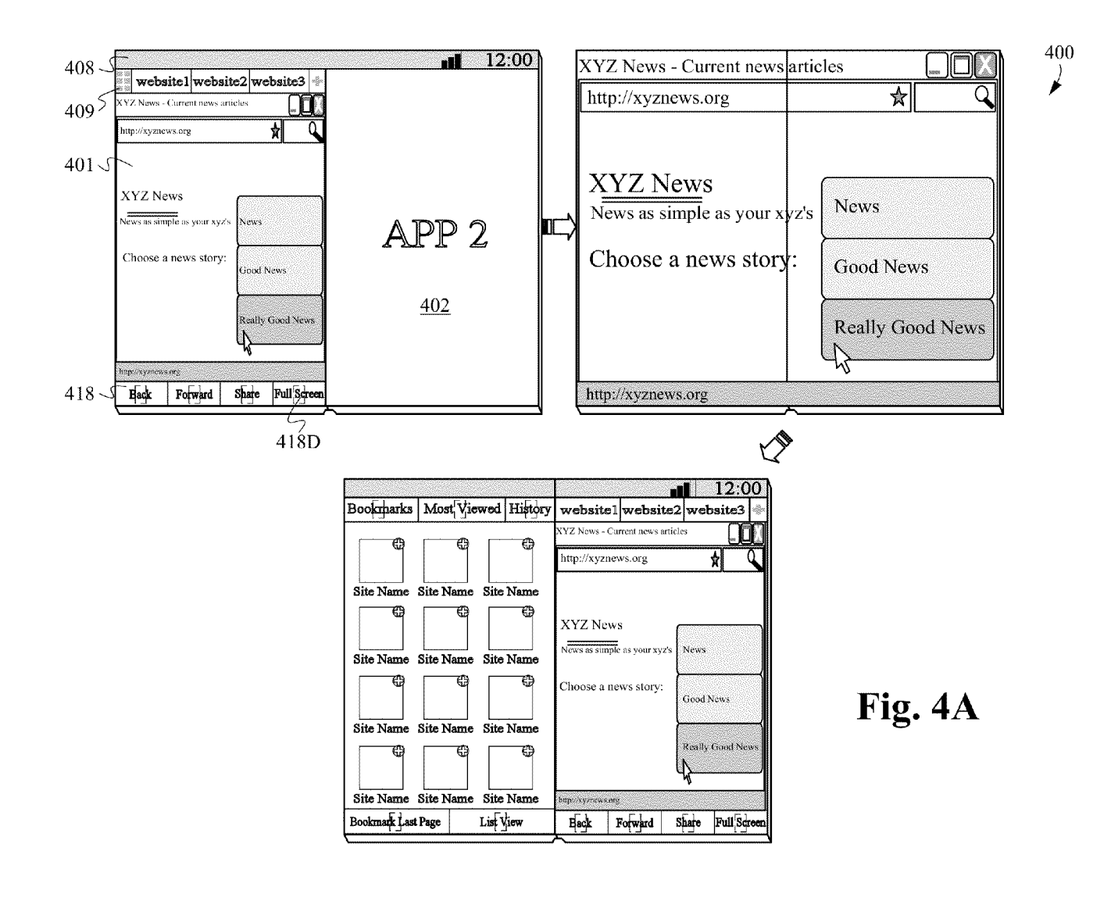
FIG. 4A shows a dual screen smartphone toggling between a full screen mode, multiple application mode, and non full screen mode.
Figure 4B:
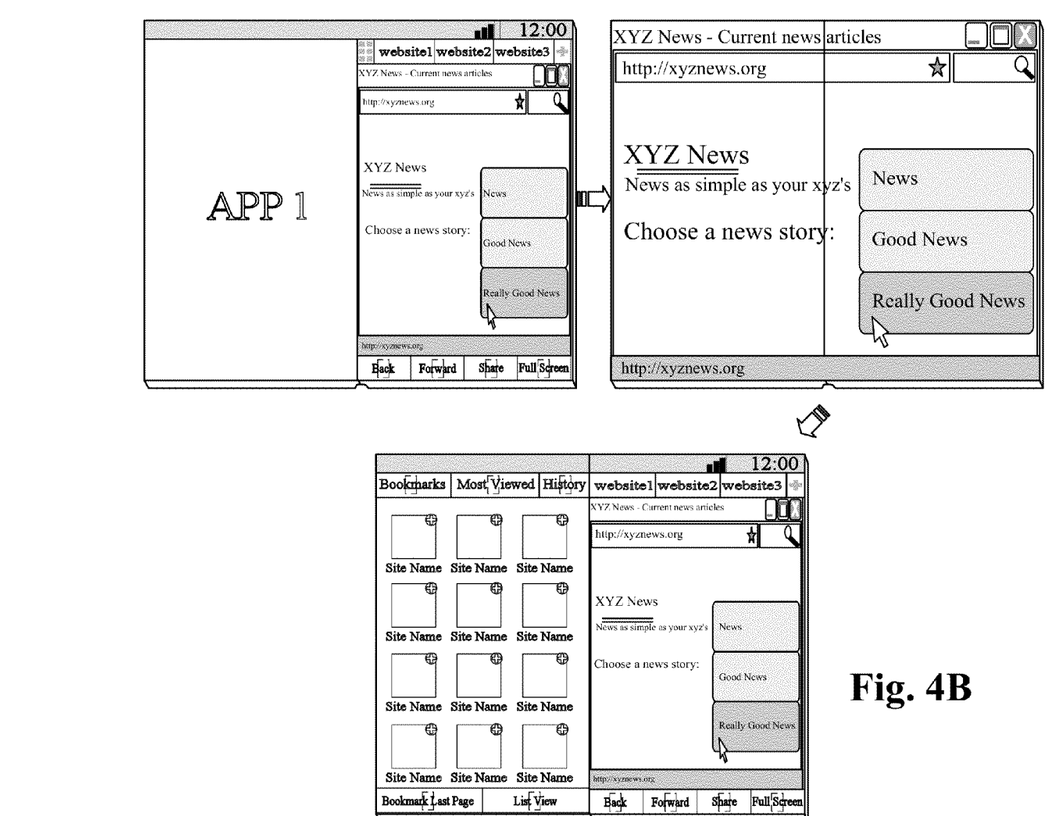
FIG. 4B shows a dual screen smartphone toggling between a full screen mode, multiple application mode, and non full screen mode.
Figure 4C:
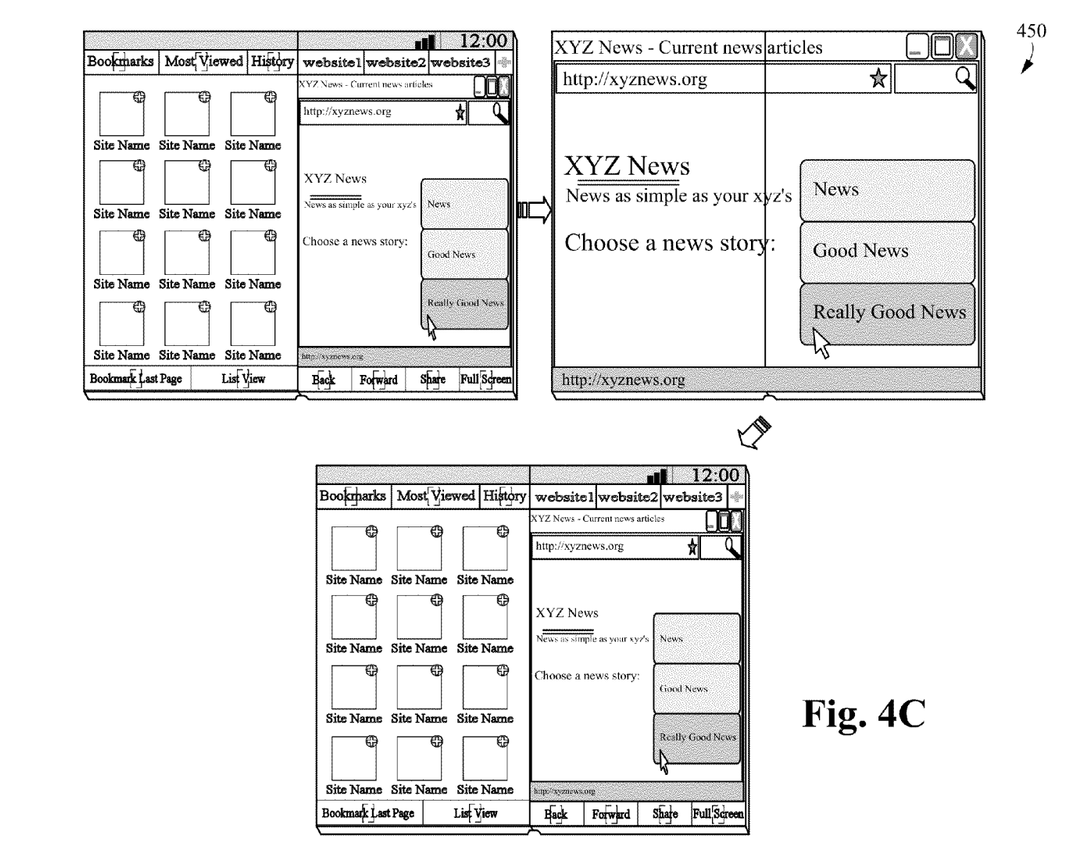
FIG. 4C shows a dual screen smartphone toggling between multiple application mode, a full screen mode, and back to full screen mode.

FIGS. 4A-4C shows several examples the smartphone described above toggling in and out of full screen mode. In the embodiments in FIGS. 4A-4C, the smartphone is shown in an open configuration toggling in and out of portrait dual full screen mode. Also, only the contiguous screens formed of the first screen 401 and second screen 402 are shown for simplicity. In the example 400, a browser application is displayed in regular mode on the first screen 401, and a second application is displayed on the second screen 402. In the regular mode, the status bar 408, secondary status bar 409 and action bar 418 are presented or displayed. Upon a prompt, such as by touching button 418D, the browser application is maximized into portrait dual full screen mode and the status bar 408, secondary status bar 409 and action bar 418 are dismissed. Upon exiting portrait dual full screen mode, such as by touching the overlay control 430, the web browser application is minimized into a regular mode on the second screen 402, while another aspect of the web browsing application is displayed on the first screen 401. Alternatively, the web browser application reverts to regular display mode on the first screen 401 and the second application is again displayed on the second screen 402. In the example 450, a browser application is being displayed on the second screen 402 with related features of the browser application displayed on the first screen 401. Upon a prompt, the processing means dismisses the status bar 408, secondary status bar 409 and action bar 418 and enters portrait dual full screen mode. Upon exiting full screen mode, the first screen 401 again displays the related features of the browser application and the second screen 402 displays the browser application.

Figure 5A:
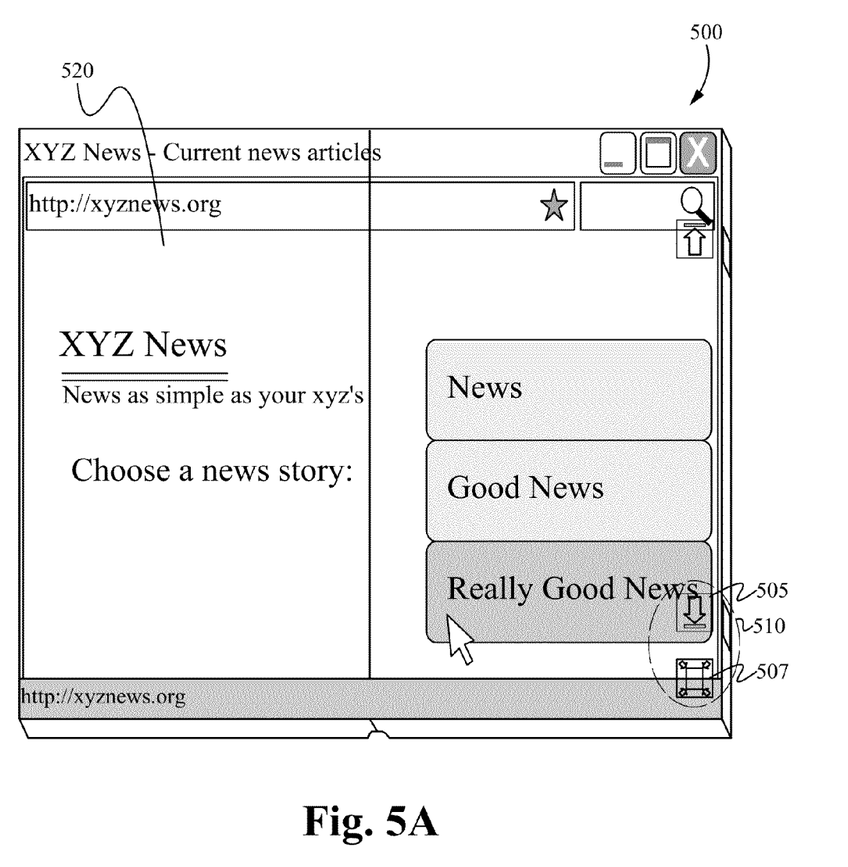
FIG. 5A shows overlay commands in full screen mode.
Figure 5B:
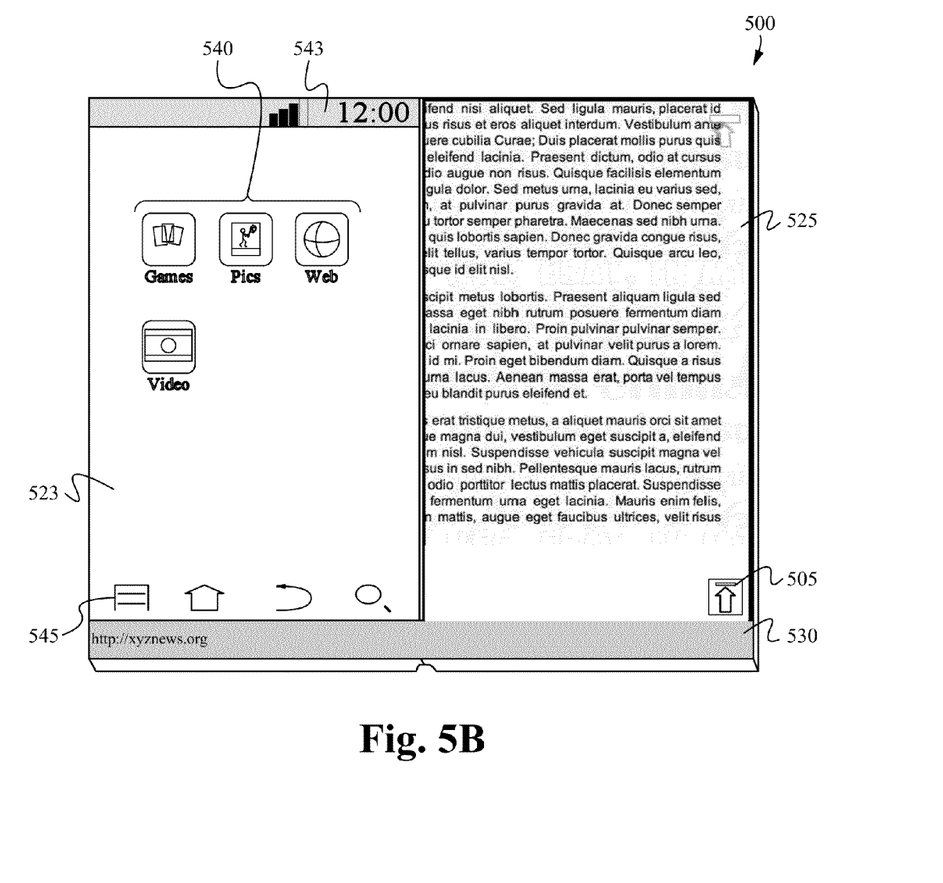
FIG. 5B shows overlay commands in minimized mode.
Figure 5C:
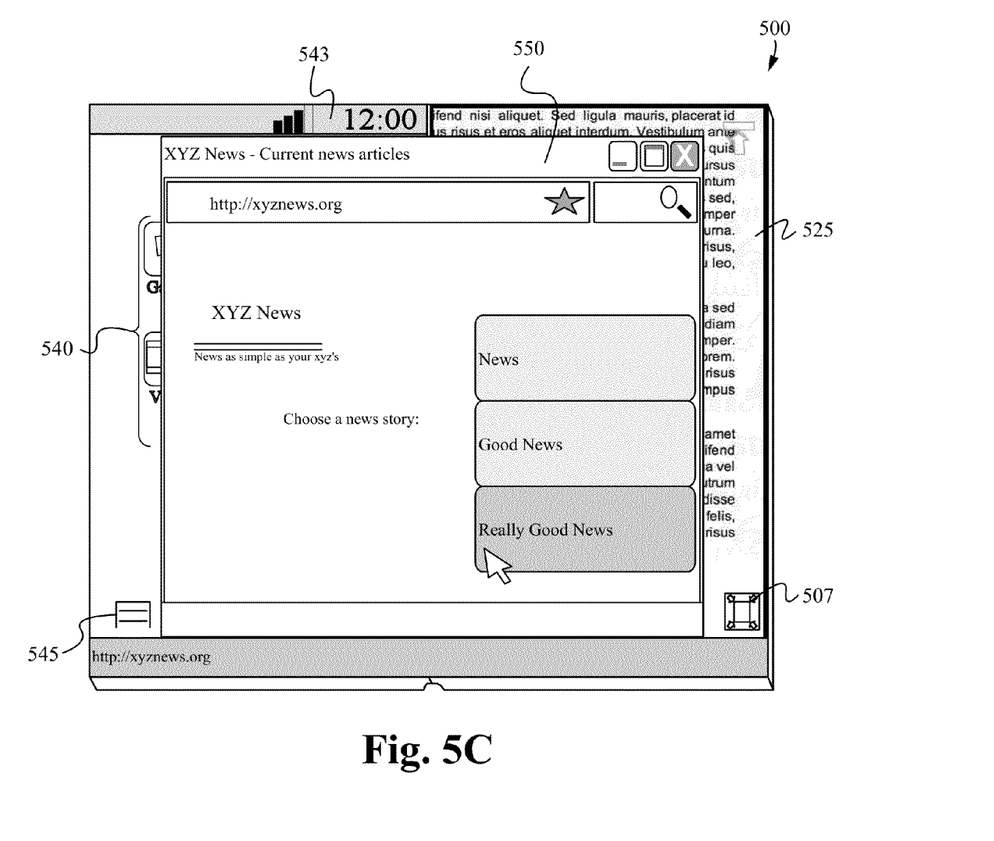
FIG. 5C shows overlay commands in tiled mode.

FIGS. 5A-5C show an examples of how overlay controls 510 are presented and interfaced by a user on a smartphone 500 as described in the previous drawings and text. As shown in FIG. 5A, the overlay controls 510 automatically appear across the dual screen 520 when the smartphone 500 has been placed in full screen mode. In some embodiments, the overlay controls 510 are semi-opaque icons representing actions that can be taken to exit full screen mode or to minimize the application. In the example of FIG. 5A, a web page is displayed on the screen 520. The web page is a canvas application. Stated differently, the user can zoom in, zoom out, and pan around the web page as desired. In some embodiments, zooming out is performed by contacting the screen 520 with the forefinger and thumb and bring the forefinger and thumb together in a pinching motion. The opposite can be done for zooming out. For panning, the user plants a finger on the screen 520 and simply drags across the screen to simulate moving physical media. Alternatively, separate semi-opaque icons can be presented to the user for the zoom in, zoom out and pan functions. Similarly, other functions can be included or programmed by the user. In the example of FIG. 5A, the overlay controls 510 comprise a minimize button 505 and an exit button 507. The minimize button 505, when engaged by a user by tapping thereon, completely minimizes the application. The minimize button 505 is represented by a an arrow pointing in a downward direction with respect to the orientation of the smartphone 500. As discussed above, the smartphone 500 preferably comprises an orientation sensing device, such as an accelerometer, for determining and orientation with respect to ground for properly displaying media.

When engaged, the minimize button 505 prompts a controller (not shown) to hide the entire application. However, the application remains in full screen mode, although hidden. FIG. 5B shows the smartphone 500 wherein the application media, in this example a web page, has been minimized. In some embodiments, the application is minimized into a bar 530 along the bottom of the screen 520. Since the applications are layers, such as well known windows in some operating systems, other applications can be running in the background. For example, a text reading application is running only on the second screen 525 under the webpage application of FIG. 5A. The user can quickly minimize the webpage application in order to access the text application. On the first screen 523, various icons 540 representing other applications are displayed along with a status bar 543 and an action bar 545. In the example of FIG. 5B, the overlay control 505 remains, but the representative arrow is reversed to indicate that the next action would maximize the webpage application.

FIG. 5C shows the webpage application as a window 550 as a result of toggling the exit button 507. In some embodiments, the exit button 507 causes whatever application is in full screen mode to exit full screen mode and become a window 550. Alternatively, the application is dismissed entirely. The window 550 is merely ordered among other applications. For example, the window 550 of FIG. 5C is on top of the text application 525 and the desktop having the icons 540. The window 550 can be grabbed and panned around by a user pressing a finger for a specified amount of time, to "grab" the window 550 and panned around by moving the finger. The window 550 can be placed in full screen mode again by tapping the exit button 507. Alternatively, double tapping anywhere along the window 550 causes the application to re-enter full screen mode. Alternatively, double tapping merely maximizes the window 550 such that the status bar 543 and action bar 545 remain displayed.

In the above embodiments, the overlay controls are not limited to dismissing the action bar, maximizing or minimizing the application, or entering or exiting full screen mode. Among other commands, the overlay controls can be configured to pan around a canvas application, zoom in or out of an application, or any other command that is convenient or necessary. Furthermore, a dedicated opaque or semi-opaque button on a touchscreen, while preferred, is not necessary. Other methods of interaction with the touch sensitive screen can call an overlay command without the existence of a specific button area on the touch sensitive screen. For example, two taps by a user's finger on an application icon calls the application. Three taps on an application icon calls the application directly into full screen mode. Similarly, on a called application in tiled mode such as shown in FIG. 5C, two taps on the window of the application can automatically put the application into full screen mode. In a minimized mode such as shown in FIG. 5B, a single tap on the minimized application places the application into tiled mode, while two taps place it into full screen mode.

Similarly, a panning function can be achieved by manipulating an overlay button. For example, a user can press and hold an overlay button to "grab" the application and then drag the application as desired. This can be especially useful in full screen mode, since no commands are presented other than the overlay buttons. A user can open a web page, zoom in to text or a picture, and then pan for a complete view of the web page. Furthermore, the panning function is no restricted to an overlay button. In some embodiments, the smartphone is configured such that the user can press and hold anywhere on the screen while an application is in full screen mode to "grab" the application.

The present invention has been described in terms of specific embodiments incorporating details to facilitate the understanding of principles of construction and operation of the invention. The several embodiments described, and the elements therein, are interchangeable among the several embodiments. In the above examples, a certain number of taps on a screen or press and hold interactions are discussed to trigger particular reactions or give particular commands. However, any combination of interactions can be programmed to elicit a desired response or give a command. Such reference herein to specific embodiments and details thereof is not intended to limit the scope of the claims appended hereto. It will be readily apparent to one skilled in the art that other various modifications are able to be made to the embodiments chosen for illustration without departing from the spirit and scope of the invention as defined by the appended claims.

What is claimed is:

1. A portable handheld device comprising:
    1. a first touch sensitive screen;
    2. a second touch sensitive screen;
    3. an action bar and a status bar disposed on at least a portion of one of the first touch sensitive screen and the second touch sensitive screen, wherein the status bar includes indicators of operation of the portable handheld device and status of any application running on the portable handheld device;
    4. a hinge for rotatable coupling the first touch sensitive screen and second touch sensitive screen and setting the device in at least one of an open and a closed position, wherein in the open position, the first touch sensitive screen and second touch sensitive screen form a single contiguous display; and
    5. a processing means for displaying media across at least one of the first touch sensitive screen, the second touch sensitive screen, and the single contiguous display, wherein the processor means is configured to:
        i. dismiss the action bar to thereby display the media across an entirety of at least one of the first touch sensitive screen, the second touch sensitive screen, and the single contiguous display; and
        ii. display an overlay control on at least one of the first touch sensitive screen, the second touch sensitive screen, and the single contiguous display, wherein actuation of the overlay control prompts the processing means to dismiss a full screen mode and re-introduce the status bar and the action bar while the media is still displayed across the entirety of the first touch sensitive screen and the entirety of the second touch sensitive screen as the single contiguous display.

2. The device of claim 1, wherein the processing means is configured to dismiss the action bar upon a prompt by a user, thereby causing the media to be displayed across the entirety of the contiguous display.

3. The device of claim 1, wherein the processing means is configured to dismiss the action bar upon a prompt by the media, thereby causing the media to be displayed across the entirety of the contiguous display.

4. The device of claim 1, wherein the processing means is configured to dismiss the action bar upon placing the device in the open position, thereby causing the media to be displayed across the entirety of the contiguous display.

5. The device of claim 1, wherein the processor is configured to present at least one overlay command function button upon displaying the media across the entirety of at least one of the first touch sensitive screen, the second touch sensitive screen, and the single contiguous display.

6. The device of claim 5, wherein the overlay command function comprises re-presenting the action bar.

7. The device of claim 5, wherein the overlay command function comprises a zoom function.

8. The device of claim 5, wherein the overlay command function comprises panning across the media.

9. The device of claim 5, wherein the overlay command function comprises a scrolling function.

10. The device of claim 1, further comprising an orientation sensing means for orienting the media.

11. The device of claim 10, wherein the orientation sensing means comprises an accelerometer.

12. The device of claim 1, wherein the media comprises a website.

13. The device of claim 1, wherein the media comprises video.

14. The device of claim 1, wherein the media comprises text.

15. A method of presenting media on a portable device having two screens, the method comprising:
   1. selectively displaying media, a status bar, and an action bar across at least one of first touch sensitive display, a second touch sensitive display, and a contiguous touch sensitive display formed by the first touch sensitive display and the second touch sensitive display, wherein the status bar includes indicators of operation of the portable device and status of any application running on the portable device;
   2. dismissing the status bar and action bar upon a prompt, such that the media is displayed across an entirety of at least one of first touch sensitive display, a second touch sensitive display, and a contiguous touch sensitive display; and
   3. display an overlay control on at least one of the first touch sensitive screen, the second touch sensitive screen, and the single contiguous display, wherein actuation of the overlay control prompts the processing means to dismiss a full screen mode and re-introduce the status bar and the action bar while the media is still displayed across the entirety of the first touch sensitive screen and the entirety of the second touch sensitive screen as the single contiguous display.

16. The method of claim 15, wherein the prompt comprises a user input.

17. The method of claim 15, wherein the prompt comprises opening the portable device.

18. The method of claim 15, wherein the prompt comprises placing the portable device in an open position.

19. The method of claim 15, wherein the prompt comprises rotating the portable device to one of a landscape and a portrait orientation.

20. The method of claim 15, wherein a different actuation of the overlay control presents the action bar and a scroll bar.

21. The method of claim 15, wherein a different actuation of the overlay control zooms the media.

22. The method of claim 15, wherein a different actuation of the overlay control pans the media.

23. The method of claim 15, wherein the action bar includes buttons for performing common tasks on the portable device, wherein the buttons include a phone button.

24. The method of claim 23, wherein the buttons included in the action bar are chosen based on frequency of use.

25. A portable smartphone comprising:
   1. a contiguous touch sensitive screen formed by the intersection of a first touch sensitive screen and a second touch sensitive screen; and
   2. a processor for displaying a status bar in a first area of one of the contiguous touch sensitive screen, first touch sensitive screen, or second touch sensitive screen and for displaying media in a second area of one of the contiguous touch sensitive screen, first touch sensitive screen, or second touch sensitive screen, wherein the first area and the second area are not overlapping areas, wherein the processor is configured to:
      i. dismiss the status bar in the first area and to expand the media such that the media is displayed in the first area and the second area upon receiving a prompt, wherein the status bar includes indicators of operation of the portable smartphone and status of any application running on the portable smartphone; and
      ii. display an overlay control on at least one of the first touch sensitive screen, the second touch sensitive screen, and the single contiguous display, wherein actuation of the overlay control prompts the processing means to dismiss a full screen mode and re-introduce the status bar and the action bar while the media is still displayed across the entirety of the first touch sensitive screen and the entirety of the second touch sensitive screen as the single contiguous display.

26. The portable smartphone of claim 25, wherein the prompt comprises at least one of a user input, rotation of the portable smartphone, calling of an application and changing the orientation of the portable smartphone.

27. The portable smartphone of claim 25, wherein the overlay control is also configured for panning the media, zooming the media, or dismissing the media.

* * * * *